(12) United States Patent
Chen

(10) Patent No.: US 9,639,137 B2
(45) Date of Patent: May 2, 2017

(54) CONTROL METHOD AND ELECTRONIC DEVICE

(71) Applicant: Lenovo (Beijing) Co., Ltd., Beijing (CN)

(72) Inventor: Yongbin Chen, Beijing (CN)

(73) Assignee: LENOVO (BEIJING) CO., LTD., Haidian District, Beijing (CN)

( * ) Notice: Subject to any disclaimer, the term of this patent is extended or adjusted under 35 U.S.C. 154(b) by 150 days.

(21) Appl. No.: 14/463,009

(22) Filed: Aug. 19, 2014

(65) Prior Publication Data

US 2015/0113302 A1    Apr. 23, 2015

(30) Foreign Application Priority Data

Oct. 18, 2013    (CN) .......................... 2013 1 0491527

(51) Int. Cl.
*G06F 1/32*    (2006.01)

(52) U.S. Cl.
CPC .................................. *G06F 1/3209* (2013.01)

(58) Field of Classification Search
None
See application file for complete search history.

(56) References Cited

U.S. PATENT DOCUMENTS

| 7,831,847 B2* | 11/2010 | Chen | G06F 1/3203 713/300 |
| 2011/0213992 A1* | 9/2011 | Satsangi | G06F 1/3209 713/300 |
| 2014/0215016 A1* | 7/2014 | Ke | G06F 3/00 709/217 |

* cited by examiner

*Primary Examiner* — Kim Huynh
*Assistant Examiner* — Paul J Yen
(74) *Attorney, Agent, or Firm* — Brinks Gilson & Lione; G. Peter Nichols

(57) ABSTRACT

A control method and an electronic device using the control method are described. The control method includes, when the processing unit is in a first state, the communicating unit receives current network data; the communicating unit determines whether a communication state of the network data satisfies a predetermined condition; if the communication state does not satisfy the predetermined condition, then the communicating unit stores the current network data into a cache module of the communicating unit; and if the communication state satisfies the predetermined condition, then the communicating unit transmits the current network data to the processing unit, so that the processing unit changes from the first state to a second state, wherein power consumption in the first state is lower than that in the second state.

12 Claims, 3 Drawing Sheets

CONTROL METHOD AND ELECTRONIC DEVICE

BACKGROUND

This application claims priority to Chinese patent application No. 201310491527.4 filed on Oct. 18, 2013, the entire contents of which are incorporated herein by reference.

The present invention relates to the field of network data reception in an electronic device, and more specifically, the present invention relates to a control method and an electronic device using the control method.

As the development of the network communication technology and the continuous improvement of the hardware performance of the electronic device, in the electronic device such as a smart phone, a tablet computer, a personal digital assistant and a laptop, more and more applications need to receive data from a server or a communication object or transmit data or request to the corresponding server or communication object via network. Meanwhile, as the improvement of the hardware performance of the electronic device and the continuous increase of the number of applications running in the background, user's experience for the electronic device is greatly influenced by the endurance (duration) of the electronic device. In order to provide the electronic device for longer endurance, various standby modes of the electronic device have been designed. In a standby status, a processing unit and the like of the electronic device are in a sleeping mode with low power consumption, whereas a communicating unit is able to use an economic approach such as "breathing type power management" to maintain the operation of the communication function.

At present, in the standby status of the electronic device, in addition to the regular timing wakeup of the real-time clock, there is still a major category for wakeup, that is, wakeup caused by data service. Specifically, when the communicating unit receives a network data packet, the communicating unit usually transmits the received data to the processing unit directly, thus waking up the processing unit from the sleeping mode so as to perform a corresponding operation process. In this way, even though the received data is invalid, it can lead to the wakeup of the processing unit. Furthermore, there may be a case that different applications continually frequently wake up the processing unit, thereby causing the power consumption of the electronic device to be increased.

Therefore, it is desirable to provide a control method and an electronic device using the control method, which are able to perform network data reception with a predetermine policy, prevent the processing unit from being waked up frequently, reduce, to the maximum extent, the standby power consumption of the electronic device, thereby improving the user's experience for the electronic device.

SUMMARY

According to one embodiment of the present invention, there is provided a control method applied to an electronic device, the electronic device comprising a processing unit and a communicating unit. The control method comprises: when the processing unit is in a first state, the communicating unit receives current network data; the communicating unit determines whether a communication state of the network data satisfies a predetermined condition; if the communication state does not satisfy the predetermined condition, then the communicating unit stores the current network data into a cache module of the communicating unit; and if the communication state satisfies the predetermined condition, then the communicating unit transmits the current network data to the processing unit, so that the processing unit changes from the first state to a second state, wherein power consumption in the first state is lower than that in the second state.

Furthermore, the control method according to one embodiment of the present invention further comprises: if the communication state satisfies the predetermined condition, then the communicating unit transmits the current network data and the network data cached in the cache module to the processing unit.

Furthermore, the control method according to one embodiment of the present invention, wherein the satisfaction of the predetermined condition denotes that the size of the network data cached in the cache module is larger than or equal to a predetermined threshold.

Furthermore, the control method according to one embodiment of the present invention, wherein the communicating unit further comprises a timing module for counting the time during which the processing unit is in the first state, and the satisfaction of the predetermined condition denotes that time during which the processing unit is in the first state is longer than or equal to a predetermined threshold time.

Furthermore, the control method according to one embodiment of the present invention, wherein the satisfaction of the predetermined condition is that the current network data is from a predetermined data resource.

Furthermore, the control method according to one embodiment of the present invention, after the processing unit changes from the first state to the second state, further comprises: the processing unit sets the predetermined condition, transmits the predetermined condition to the communicating unit, and changes from the second state to the first state.

According to another embodiment of the present invention, there is provided an electronic device, comprising: a processing unit for running a operation system and an application, the processing unit having a first state and a second state with the power consumption in the first state being lower than that in the second state; and a communicating unit for performing data communication via network, the communicating unit further comprising a cache module and a determining module; wherein when the processing unit is in the first state, the communicating unit receives current network data; the determining module determines whether a communication state of the network data satisfies a predetermined condition; if the communication state does not satisfy the predetermined condition, then the communicating unit stores the current network data into the cache module; and if the communication state satisfies the predetermined condition, then the communicating unit transmits the current network data to the processing unit, so that the processing unit changes from the first state to the second state.

Furthermore, the electronic device according to another embodiment of the present invention, wherein if the communication state satisfies the predetermined condition, then the communicating unit transmits the current network data and the network data cached in the cache module to the processing unit.

Furthermore, the electronic device according to another embodiment of the present invention, wherein the satisfaction of the predetermined condition denotes that the size of the network data cached in the cache module is larger than or equal to that of a predetermined threshold.

Furthermore, the electronic device according to another embodiment of the present invention, wherein the communicating unit further comprises a timing module for counting the time during which the processing unit is in the first state, and the satisfaction of the predetermined condition denotes that time during which the processing unit is in the first state is longer than or equal to a predetermined threshold time.

Furthermore, the electronic device according to another embodiment of the present invention, the satisfaction of the predetermined condition denotes that the current network data is from a predetermined data resource.

Furthermore, the electronic device according to another embodiment of the present invention, wherein the processing unit sets the predetermined condition and transmits the predetermined condition to the communicating unit, when the processing unit changes from the second state to the first state.

The control method and the electronic device using the control method according to the embodiments of the present invention are able to perform the network data reception with a predetermine policy, prevent the processing unit from being waked up frequently, reduce, to the maximum extent, standby power consumption of the electronic device, thereby improving the user's experience for the electronic device.

It will be appreciated that both the aforementioned general description and the following detailed description are exemplified, and are intended to provide a further description for the claimed technology.

DETAILED DESCRIPTION

Hereinafter, the embodiments, applications and modifications will be described with reference to the accompanying drawings. Furthermore, the following described embodiments are preferred specific examples, and various technically preferred limitations are imposed thereto. However, in the following description, the present invention is not limited to these embodiments.

First, the electronic device according to the present invention will be described with reference to FIG. 1. The electronic device is, for example, a smart phone, a personal computer, a tablet computer, etc.

Figure 1:
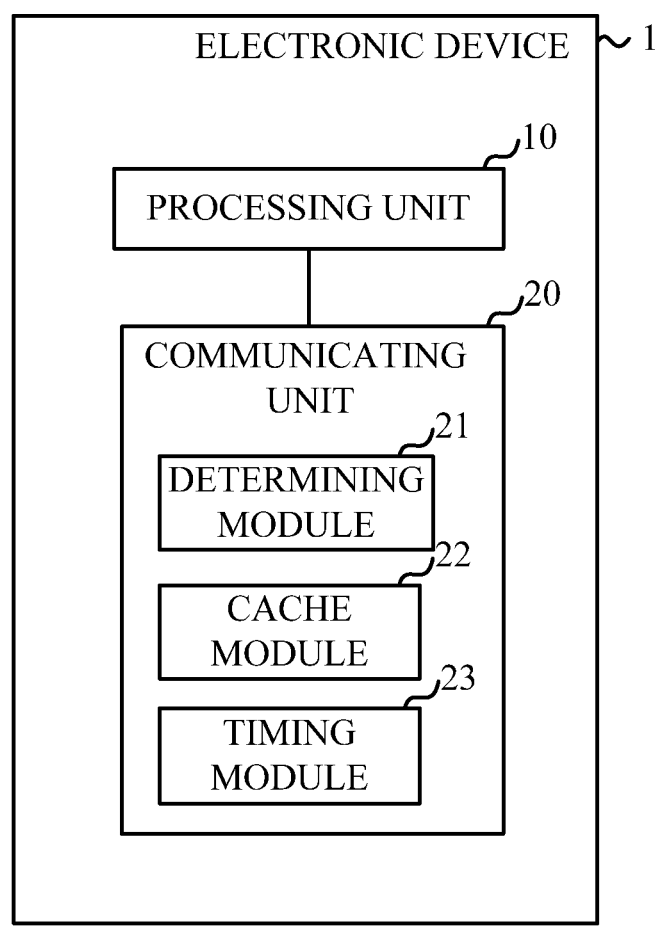
FIG. 1 is a block diagram illustrating an electronic device according to an embodiment of the present invention.

As shown in FIG. 1, an electronic device 1 according to the embodiment of the present invention has a processing unit 10 and a communicating unit 20. It is easy to understand that only components closely related to the present invention are illustrated in FIG. 1 in order to simplify the description, and of course other components, such as a display unit, an input/output unit and the like, can also be included in the electronic device 1 according to the embodiment of the present invention.

Specifically, the processing unit 10 of the electronic device 1 illustrated in FIG. 1 can be used to run operation systems and applications. The communicating unit 20 is used to perform data communication via network. The communicating unit 20 can also communicate with other electronic devices or servers via the network in wired or wireless way, so as to receive and transmit desired data and services from/to other electronic devices or servers. In one embodiment of the present invention, the electronic device 1 can be a communication device based on a collaborative architecture of a communication processor (CP) and an application processor (AP), wherein the processing unit 10 is the application processor (AP) and the communicating unit 20 is the communication processor (CP). Furthermore, in another embodiment of the present invention, the electronic device 1 can be a traditional architecture in which a Central Processing Unit (CPU) runs the operation systems and the applications, and other components, such as a memory unit, an input/output unit, a communicating unit and the like are controlled by the CPU, wherein the processing unit 10 is the Central Processing Unit (CPU) and the communicating unit 20 is a communicating unit such as a modem or a network card.

In the electronic device 1 as shown in FIG. 1, according to the running condition of the device or a setting from the user, the processing unit 10 can be in different operation states, such as normal operation state and sleeping or standby state. Generally, in order to solve the power consumption of the electronic device 1, the electronic device 1 can be set into the sleeping or standby state with low power consumption in the case that there is no need for the processing unit 10 to perform a process. However, in response to data reception and it is needed to perform a process corresponding to the received data, the processing unit 10 can be switched from the sleeping or standby state with low power consumption to the normal operation state with high power consumption. Therefore, if the processing unit 10 is in a first state with low power consumption, once receiving network data, the communicating unit 20 transmits the network data to the processing unit 10 in order to wake up the processing unit 10 to a second state with high power consumption to perform the corresponding process, then a case that the processing unit 10 is frequently waked up occurs, and thus the power consumption of the electronic device 1 is greatly increased.

Therefore, the communicating unit 20 of the electronic device 1 according to the embodiment of the present invention is designed to further include a determining module 21, a cache module 22 and a timing module 23. If when the processing unit 10 is in the first state with low power consumption, the communicating unit 20 receives current network data, then the determining module 21 determines whether the communication state of the network data satisfies a predetermined condition. Hereinafter, the setting and determining processes of the predetermined condition and specific examples thereof will be further described in detail with reference to FIGS. 2 and 3. If the determining module 21 determines that the communication state of the network data satisfies the predetermined condition, then the communicating unit 20 transmits the current network data to the processing unit 10 so that the processing unit 10 changes from the first state to the second state so as to perform the corresponding process. On the contrary, if the determining module 21 determines that the communication state of the network data does not satisfy the predetermined condition, then the communicating unit 20 stores the current network data into the cache module 22. In an embodiment of the present invention, if the determining module 21 determines that the communication data of the network data satisfies the predetermined condition, then the communicating unit 20 transmits the network data cached in the cache module 22 to the processing unit 10 while transmitting the current network data to the processing unit 10.

Specifically, in a preferred embodiment of the present invention, satisfaction of the predetermined condition may refer that the size of the network data cached in the cache module 22 is larger than or equal to a predetermined threshold. In this way, the received network data is transmitted to the processing unit 10 to be processed only when the amount of the network data received by the communicating unit 20 reaches the predetermined threshold, thereby preventing the processing unit 10 from being waked up frequently, thus realizing the data amount alignment transmission of the network data.

Further, in another preferred embodiment of the present invention, the satisfaction of the predetermined condition may also refer that the time during which the processing unit 10 is in the first state is longer than or equal to a predetermined threshold time. As shown in FIG. 1, the timing module 23 of the communicating unit 20 is used for counting the time during which the processing unit 10 is in the first state, and the received network data is transmitted to the processing unit 10 to be processed only when the time during which the processing unit 10 is in the first state reaches the predetermined threshold time, thereby preventing the processing unit 10 from being waked up frequently, thus realizing the time alignment transmission of the network data. For example, the predetermined threshold time may be set to be 5 minutes, and when the time during which the processing unit 10 is in the first state, counted by the timing module 23, is 2 minutes, if the communicating unit 20 receives the network data, then the network data is not transmitted, and is cached in the cache module 22. Further, when the predetermined threshold time is reached 3 minutes later, the communicating unit 20 transmits the network data received at this time as well as the data cached in the cache module 22 to the processing unit 10.

Furthermore, in another preferred embodiment of the present invention, satisfaction of the predetermined condition may also refer that the current network data is from a predetermined data resource. For example, a user of the electronic device 1 can preset a specific application (e.g. an instant communication application (such as youyue, Wechat, QQ, etc.) and a security defense application (such as a firewall application, an antivirus application, a Trojan detection application, etc.)) as a high-priority application, so that even when the processing unit 10 is in the first state, once the communicating unit 20 receives the network data from the high-priority application, the communicating unit 20 transmits the network data to the processing unit 10, in spite of whether other predetermined conditions as described above (e.g., the size of the network data cached in the cache module 22 is larger than or equal to the predetermined threshold or the time during which the processing unit 10 is in the first state is longer than or equal to the predetermined threshold time) are set or not.

Hereinabove, the electronic device according to the embodiment of the present invention has been described with reference to FIG. 1. Hereinafter, the control method according to an embodiment of the present invention will be further described with reference to FIGS. 2 and 3.

Figure 2:
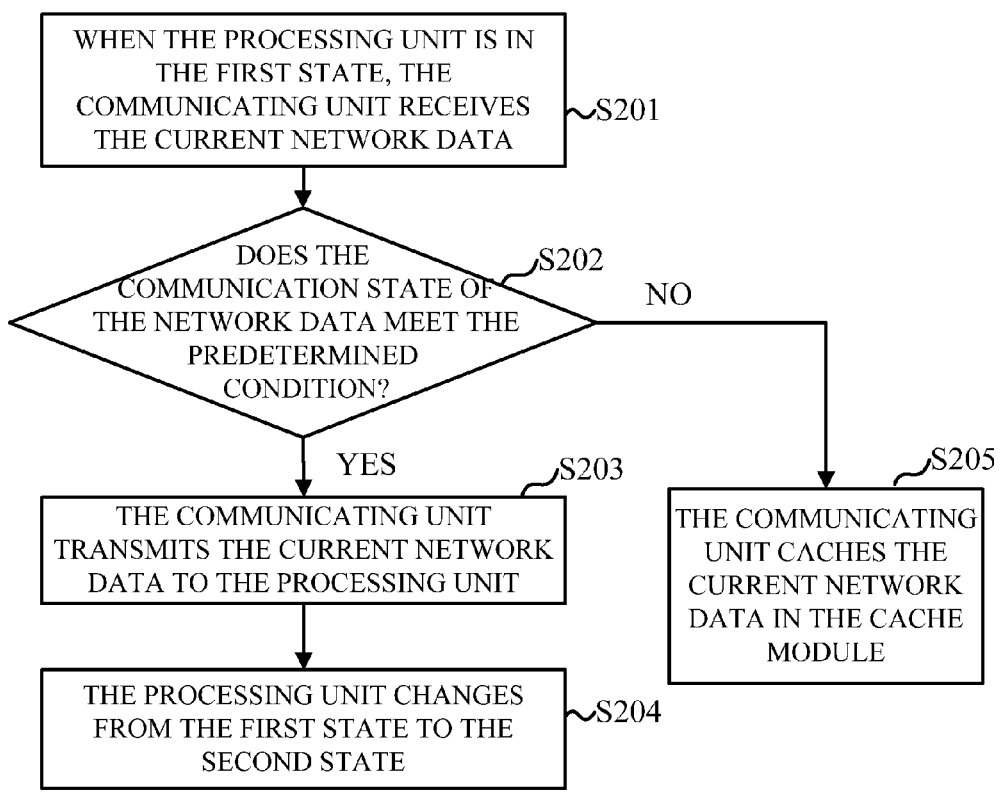
FIG. 2 is a flowchart illustrating a controlling method according to an embodiment of the present invention.

FIG. 2 is a flowchart illustrating the control method according to the embodiment of the present invention. As shown in FIG. 2, the control method according to the embodiment of the present invention includes the following steps:

At Step S201, the processing unit 10 is in the first state, and the communicating unit 20 receives the current network data. Subsequently, the process proceeds to Step S202.

At Step S202, the communicating unit 20 determines whether the communication state of the network data satisfies the predetermined condition or not. As above described with reference to FIG. 1, the determining module 21 in the communicating unit 20 performs the determination. Satisfaction of the predetermined condition may refer that the size of the network data cached in the cache module 22 is larger than or equal to a predetermined threshold, the satisfaction of the predetermined condition may also refer that the time during which the processing unit 10 is in the first state is longer than or equal to the predetermined threshold time, or the satisfaction of the predetermined condition may also be that the current network data is from the predetermined data resource.

If a positive outcome is obtained at Step S202, that is, the determining module 21 in the communicating unit 20 determines that the communicating state of the network data satisfies the predetermined condition, then the process proceeds to Step S203.

At Step S203, the communicating unit 20 transmits the current network data to the processing unit 10. Subsequently, the process proceeds to Step S204.

At Step S204, the processing unit changes from the first state to the second state so as to perform corresponding process on the received network data.

On the contrary, if a negative outcome is obtained at Step S202, that is, the determining module 21 in the communicating unit 20 determines that the communicating state of the network data does not satisfy the predetermined condition, then the process proceeds to Step S205.

At Step S205, the communicating unit 20 stores the current network data into the cache module 22.

In the electronic device using the control method as shown in FIG. 2, the communicating unit 20 transmits the network data to the processing unit 10 only when the predetermined condition preset is met, thereby realizing execution of the network data reception with a predetermined policy, prevent the processing unit from being waked up frequently, reduce, to the maximum extent, the standby power consumption of the electronic device, thus improving the user's experience for the electronic device.

Figure 3:
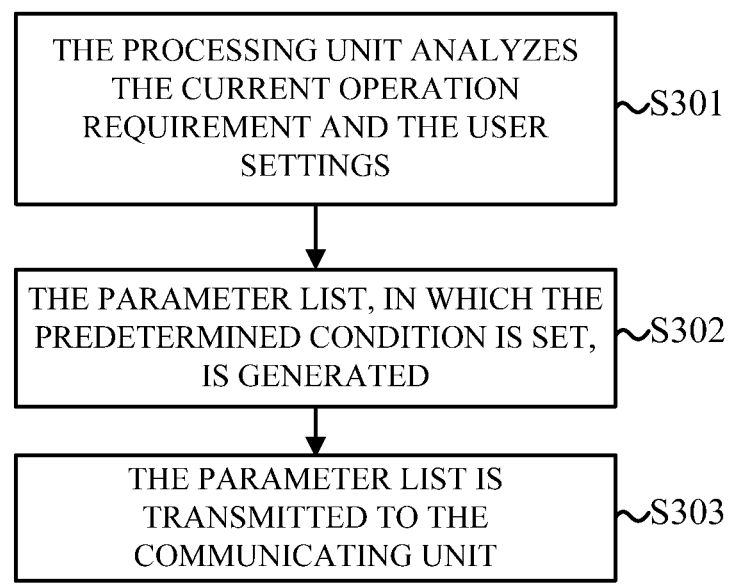
FIG. 3 is a flowchart illustrating a setting process of a predetermined condition in the controlling method according to the embodiment of the present invention.

FIG. 3 is a flowchart illustrating a setting process of a predetermined condition in the control method according to the embodiment of the present invention.

Hereinabove, the control method according to the embodiment of the present invention has been described with reference to FIG. 2. Thus, the setting process of the predetermined condition in the control method will be further described with reference to FIG. 3.

Specifically, as shown in FIG. 3, the setting process of the predetermined condition can include the following steps.

At Step S301, the processing unit 10 analyzes the current operation requirement and user settings. For example, the processing unit 10 can analyze whether the user indicates, by the input unit, that the electronic device needs to enter into a power-saving state. If the user indicates that it needs to enter into the power-saving state, then the processing unit 10 further performs the following setting of the predetermined condition. Furthermore, the processing unit 10 analyzes the current operation requirement to determine whether the electronic device needs to enter in the power-saving state to perform the following setting of the predetermined condition. For example, when the power of the electronic device 1 is lower than the predetermined threshold, the processing unit 10 can determine that the electronic device 1 needs to be set into the power-saving state, thereby performing the setting of the predetermined condition.

When it is determined that the setting of the predetermined condition needs to be performed at Step 301, at Step S302, the processing unit 10 generates a parameter list in which the predetermined condition is set. As above described, the parameter list in which the predetermined condition is set can record, for example, a predetermined threshold parameter for the size of the cached network data, a predetermined threshold parameter for the time during which the processing unit 10 is in the state with low power consumption, and a predetermined data resource parameter of the network data.

Subsequently, at Step S303, the processing unit 10 transmits the generated parameter list to the communicating unit 20. When receiving new network data, the communicating unit 20 can search the parameter list so as to determine whether the communication state of the network data satisfies the predetermined condition recorded in the parameter list.

Hereinabove, the control method and the electronic device using the control method according to the embodiments of the present invention have been described with reference to FIGS. 1-3, which can perform the network data reception with the predetermined policy, prevent the processing unit from being waked up frequently, reduce, to the maximum extent, the standby power consumption of the electronic device, thus improving the user's experience for the electronic device.

It should be noted that, in the present specification, the term "include", "comprise" or any other variation thereof is intended to cover non-exclusive inclusion, so that a process, a method, an object or a device including a series of elements includes not only those elements, but also other elements not specifically listed, or inherent elements for the process, the method, the object or the device. In the case that there is no further definition, the elements defined by a sentence "include a . . . " do not exclude the fact that there are other identical elements in the process, the method, the object or the device including the elements.

At last, it should also be noted that the a series of processes described above include not only the processes performed in chronological order by the sequence described herein, but also the processes performed in parallel or separately rather than in chronological order.

Through the above description of the embodiments, those skilled in the related art can clearly understand that the present invention can be realized by combination of software and a necessary hardware platform, and of course, it can also be implemented completely by hardware. Based on such understanding, all of or a part of the contribution made by the technical solution of the present invention to the background technology can be embodied in a software product, wherein the computer software product can be stored in a storage medium, such as a ROM/RAM, a magnetic disk, an optical disk and the like, and includes a number of instructions so that a computer apparatus (it can be a personal computer, a server or a network apparatus, etc.) performs the method described in each embodiment or some parts of the embodiment of the present invention.

Hereinabove, the present invention has been described in detail, and the principles and the embodiments of the present invention have been explained by utilizing specific examples herein, and the above description of the embodiments is just for helping to understand the method of the present invention and the core concept thereof; meanwhile, there may be modifications within the scope of the embodiments and the applications for those skilled in the related art according to the concept of the present invention. In conclusion, the content of the present description should not be considered as a limitation of the present invention.

The invention claimed is:

1. A control method applied to an electronic device, the electronic device comprising a processor and a network card with a cache module, the control method comprising:
    when the processor is in a first state, the network card receiving current network data;
    the network card determining whether a communication state of the network data satisfies a predetermined condition;
    if the communication state does not satisfy the predetermined condition, then the network card stores current network data into the cache module of the network card; and
    if the communication state satisfies the predetermined condition, then the network card transmits current network data to the processor, by-passing the cache module, so that the processor changes from the first state to a second state,
    wherein power consumption in the first state is lower than that in the second state.

2. The control method according to claim 1, further comprising, if the communication state satisfies the predetermined condition, then the network card transmits current network data and the network data cached in the cache module to the processor.

3. The control method according to claim 1, wherein satisfaction of the predetermined condition denotes that the size of the network data cached in the cache module is larger than or equal to a predetermined threshold.

4. The control method according to claim 1, wherein the network card further comprises a timing module for counting a time during which the processor is in the first state, and satisfaction of the predetermined condition denotes that time during which the processor is in the first state is longer than or equal to a predetermined threshold time.

5. The control method according to claim 1, wherein satisfaction of the predetermined condition denotes that the current network data is from a predetermined data resource.

6. The control method according to claim 1, wherein after the processor changes from the first state to the second state, the method further comprises the processor setting the predetermined condition, transmitting the predetermined condition to the network card, and changing from the second state to the first state.

7. An electronic device, comprising:
    a processor for running an operation system and an application, the processor comprising a first state and a second state, with a power consumption in the first state being lower than that in the second state; and
    a network card in data communication via a network, the network card further comprising a cache module and a determining module;
    wherein when the processor is in the first state, the network card receives current network data; the determining module determines whether a communication state of the network data satisfies a predetermined condition; if the communication state does not satisfy the predetermined condition, then the network card stores the current network data into the cache module; and if the communication state satisfies the predetermined condition, then the network card transmits the current network data to the processor, so that the processor changes from the first state to the second state.

8. The electronic device according to claim 7, wherein if the communication state satisfies the predetermined condition, then the network card transmits the current network data and the network data cached in the cache module to the processor.

9. The electronic device according to claim 7, wherein satisfaction of the predetermined condition denotes that the size of the network data cached in the cache module is larger than or equal to a predetermined threshold.

10. The electronic device according to claim 7, wherein the network card further comprises a timing module for counting the time during which the processor is in the first state, and satisfaction of the predetermined condition denotes that time during which the processor is in the first state is longer than or equal to a predetermined threshold time.

11. The electronic device according to claim 7, wherein satisfaction of the predetermined condition denotes that the current network data is from a predetermined data resource.

12. The electronic device according to claim 7, wherein the processor sets the predetermined condition and transmits the predetermined condition to the network card.

\* \* \* \* \*